United States Patent [19]

Brown

[11] Patent Number: 4,545,561

[45] Date of Patent: Oct. 8, 1985

[54] PIEZOELECTRIC VALVE OPERATOR

[75] Inventor: Henry C. Brown, Dallas, Tex.

[73] Assignee: McDonnell Douglas Corporation, Long Beach, Calif.

[21] Appl. No.: 657,473

[22] Filed: Oct. 4, 1984

Related U.S. Application Data

[63] Continuation of Ser. No. 403,813, Jul. 30, 1982, abandoned.

[51] Int. Cl.$^4$ ............ F16K 31/04; H01L 41/08
[52] U.S. Cl. ................. 251/129.08; 310/330; 310/348; 310/369; 318/116
[58] Field of Search ........... 251/129, 368; 318/116; 310/330, 348, 369

[56] References Cited

U.S. PATENT DOCUMENTS

| | | | |
|---|---|---|---|
| 2,902,251 | 9/1959 | Oncley | 251/129 |
| 3,360,664 | 12/1967 | Straube | 310/330 |
| 3,465,732 | 9/1969 | Kattchee | 123/32 |
| 3,524,474 | 8/1970 | McCormick | 251/129 X |
| 3,614,486 | 10/1971 | Smiley | 310/8.2 |
| 3,981,480 | 9/1976 | Eernisse et al. | 251/129 |
| 4,166,605 | 9/1979 | Hall et al. | 251/129 |

FOREIGN PATENT DOCUMENTS

| | | | |
|---|---|---|---|
| 52-50010 | 4/1977 | Japan | 251/129 |

OTHER PUBLICATIONS

*Application Note Ceramic Audio Tone Transducers*, Gulton Industries, Inc. (1980), No. 7909.
*Product Specification Piezoceramic Bender Elements*, Gulton Industries, Inc. (1980), No. 1CN8008.
*Product Specification CATT Tone Transducers*, Gulton Industries, Inc. (1980), No. 1CN7913.
*Piezoelectrics, An Introduction For Product Designers*, PEPI Engineering Services, Piezo Electric Products, Inc.
*Application Note Piezoceramic Bender Elements*, Gulton Industries, Inc. (1978), No. 1CN7806.
*Design Note Piezoceramics*, Gulton Industries, Inc. (1979), No. 1CN7911.

*Primary Examiner*—Arnold Rosenthal
*Attorney, Agent, or Firm*—Gregory A. Cone; George W. Finch; Donald L. Royer

[57] ABSTRACT

A valve (10) is provided for the control of fluid flow. The valve (10) includes a housing (20) having a fluid inlet aperture (40) and a fluid outlet aperture (48). A piezoelectric device (12) is disposed within the housing (20) adjacent the fluid inlet aperture (40) and the fluid outlet aperture (48). Structure (52, 54) is provided for applying a voltage to the piezoelectric device (12) for causing motion of the piezoelectric device (12) to thereby establish a path (62) within the housing (20) between the fluid inlet aperture (40) and the fluid outlet aperture (48) to enable fluid to flow through the housing (20).

4 Claims, 3 Drawing Figures

PIEZOELECTRIC VALVE OPERATOR

This is a continuation of application Ser. No. 403,813, filed July 30, 1982, now abandoned.

TECHNICAL FIELD

This invention relates to control valves, and more particularly to a piezoelectric valve operator.

BACKGROUND ART

Control valves are utilized for numerous purposes. Valves for controlling the passage therethrough of fluids, such as, for example, liquids or gases, are structured in accordance with the operating function to be performed by such valves. These functions can range from the control of water in a water faucet to the control of pneumatic and hydraulic flow for the operation of mechanical devices.

Previously developed control valves have included solenoid operated valves which have proved to be reliable; however, such valves are large in size and weight. Additionally, such valves are expensive and costly to maintain and operate. Piezoelectric control valves have been used as a substitute for solenoid operated valves thereby eliminating the weight and size associated with such solenoid operated valves. One such piezoelectric control valve is described in U.S. Pat. No. 3,465,732 issued to Kattchee on Sept. 9, 1969 and entitled "Piezoelectric Control Valve". Such previously developed piezoelectric control valves have required extensive associated components resulting in a complicated valve arrangement requiring several moving parts resulting in increased costs and poor reliability.

A need has thus arisen for a piezoelectric control valve including a piezoelectric valve operator that is simple in construction to improve the reliability and manufacturing costs involved in such control valves. Furthermore, a need has arisen for a piezoelectric control valve that is lightweight and compact in size to enable such a control valve to have sufficient versatility to be utilized in a broad range of applications.

DISCLOSURE OF THE INVENTION

In accordance with the present invention, a piezoelectric valve operator is provided which substantially eliminates the problems heretofore associated with such valve operators.

In accordance with the present invention, a valve for the control of fluid is provided. The valve includes a housing having a fluid inlet aperture and a fluid outlet aperture. A piezoelectric device is disposed within the housing adjacent the fluid inlet aperture and fluid outlet aperture. Voltage is applied to the piezoelectric device for causing motion of the piezoelectric device to thereby establish a path within the housing between the fluid inlet aperture and fluid outlet aperture to enable fluid to flow through the housing.

In accordance with yet another aspect of the present invention, a valve for the control of a fluid is provided. The valve includes a housing having a fluid inlet aperture and a fluid outlet aperture. A piezeoelectric device is disposed within the housing and is operable between first and second positions. The piezoelectric device in the first position is disposed adjacent the fluid inlet aperture to thereby prevent fluid from entering the housing and is disposed in the second position spaced apart from the fluid inlet aperture to thereby permit fluid to enter the housing and to further permit the fluid inlet aperture and the fluid outlet aperture to lie in fluid communication, such that the fluid flows within the housing from the fluid inlet aperture to the fluid outlet aperture. Voltage is applied to the piezoelectric device for moving the piezoelectric device between the first and second positions.

BRIEF DESCRIPTION OF THE DRAWINGS

For a more complete understanding of the present invention and for further advantages thereof, reference is now made to the following Detailed Description, taken in conjunction with the accompanying Drawings in which.

DETAILED DESCRIPTION

Figure 1:
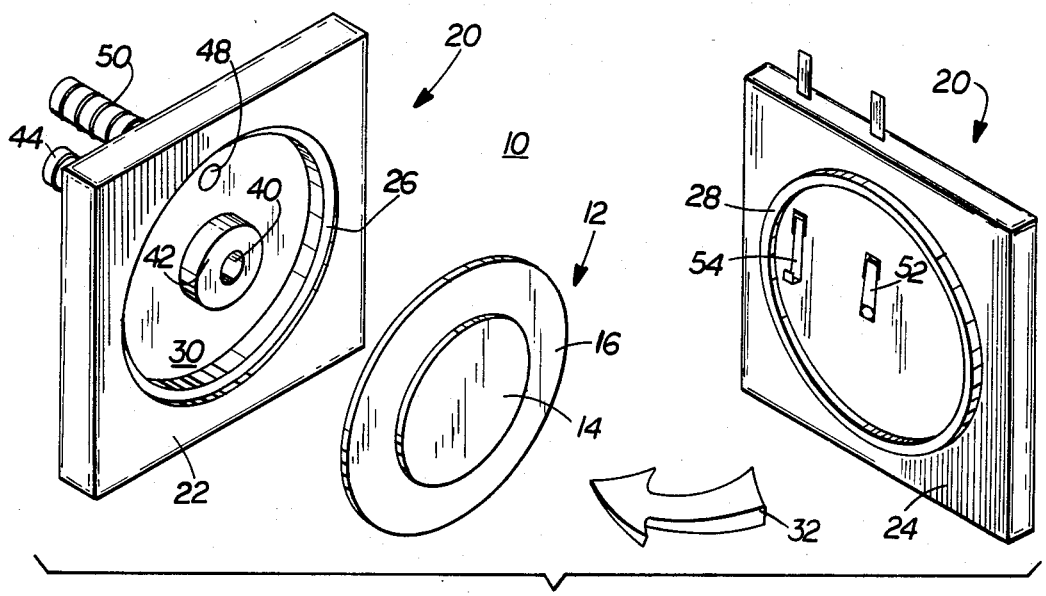
FIG. 1 is an exploded perspective view of the present piezoelectric valve operator.
Figure 2:
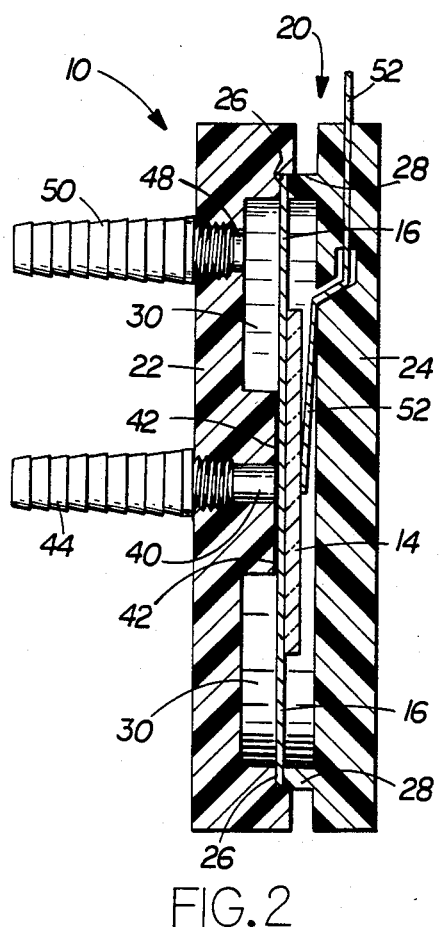
FIG. 2 is a sectional view of the assembled piezeoelectric valve operator of FIG. 1 wherein the piezoelectric device is deactuated.

Referring simultaneously to FIGS. 1 and 2, the present piezoelectric valve operator is illustrated and is generally identified by the numeral 10. Piezoelectric valve operator 10 includes a piezoelectric device generally identified by the numeral 12. Piezoelectric valve operator 10 may be utilized for the control of fluids such as, for example, liquids as well as gases, both the presence and absence of a gas, such as a vacuum, for use in, for example, flow valves, vacuum pick-up heads and pneumatic and hydraulic devices.

Piezoelectric device 12 includes a ceramic element 14 and a metal support structure 16. Ceramic element 14 is bonded to metal support structure 16 using techniques well known to those skilled in the art. Piezoelectric device 12 is commonly referred to as a single laminate bender, such that when a voltage is applied to ceramic element 14, ceramic element 14 will expand or contract to thereby bend metal support structure 16. Such a piezoelectric device 12 is manufactured and sold by Piezo Products Division, Gluton Industries, Inc. of Mutuchen, N.J. The size of piezoelectric device 12 may vary depending upon the operating parameters of the system utilizing piezoelectric valve operator 10 and may be dimensioned, for example, such that ceramic element 14 has a diameter of approximately one inch and metal support structure 16 has a diameter of approximately 1.5 inches. Although piezoelectric device 12 is illustrated in FIG. 1 as being a disc, other configurations may be utilized such as rectangular or square shaped devices and it should be understood that the circular configuration of piezoelectric device 12 shown in FIG. 1 is for illustrative purposes only.

Piezoelectric valve operator 10 further includes a housing, generally identified by the numeral 20 composed of housing members 22 and 24. Housing members 22 and 24 are disposed in a mating relationship indicated by arrow 32, such that piezoelectric device 12 is disposed between housing members 22 and 24 of housing 20. Housing 20 may be manufactured from plastic material, such as, for example, Delrin.

As more clearly illustrated in FIG. 2, housing member 22 includes a recess 26 for receiving a ring 28 which is integral with housing member 24. When assembled, the outer periphery of metal support structure 16 of piezoelectric device 12 is retained within recess 26 and housing member 22 by ring 28 of housing member 24. Piezoelectric device 12 thereby operates as an edge mounted piezoelectric device within housing 20. Housing members 22 and 24 of housing 20 may be joined together by utilizing, for example, screws (not shown) or bonding cement.

Housing member 22 includes a cavity 30 which is closed by metal support structure 16 of piezoelectric device 12 when piezoelectric valve operator 10 is assembled as illustrated in FIG. 2.

Contained within housing member 22 is a fluid inlet aperture 40 which is surrounded by a seat 42 extending into cavity 30. Interconnected to fluid inlet aperture 40 is a fluid line connector 44 which receives a hose (not shown) or other linkage. Further disposed within housing member 22 is a fluid outlet aperture 48 which extends into cavity 30. Interconnected to fluid outlet aperture 48 is a fluid line connector 50 which is similar in construction to fluid line connector 44 for receiving a fluid line or other linkage.

Disposed within housing member 24 of housing 20 are spring electrical contacts 52 and 54. Electrical contact 52 contacts ceramic element 14 and electrical contact 54 contacts metal support structure 16 of piezoelectric device 12. Electrical contacts 52 and 54 are interconnected to a suitable voltage source (not shown) for controlling actuation of piezoelectric device 12 and are displaced by movement of piezoelectric device 12.

Figure 3:
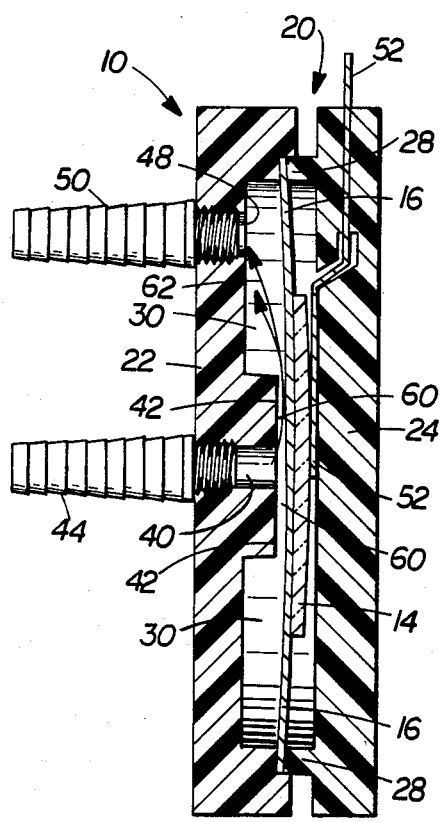
FIG. 3 is a sectional view of the assembled piezoelectric valve operator of FIG. 1 wherein the piezoelectric device is actuated.

Referring simultaneously to FIGS. 2 and 3, the operation of the present piezoelectric valve operator 10 will now be described. Piezoelectric device 12 operates such that ceramic element 14 changes its diameter when an electrical signal is applied across piezoelectric device 12. This change in diameter of ceramic element 14 causes metal support structure 16 to act as a restraining spring force on one surface of ceramic element 14. The voltage applied through electrical contacts 52 and 54 to ceramic element 14 and metal support structure 16 causes the diameter of ceramic element 14 to change which causes piezoelectric device 12 to bend from the flat shape, deactuated state, as illustrated in FIG. 2, to a convex shape, actuated state, as illustrated in FIG. 3. FIG. 2 illustrates piezoelectric device 12 with no voltage applied to electrical contacts 52 and 54, such that piezoelectric device 12 is in the deactuated state where metal support structure 16 lies in contact with seat 42 to thereby close and seal fluid inlet aperture 40 to prevent fluid from entering housing 20. Since fluid inlet aperture 40 is closed, no fluid flows through cavity 30 of housing member 22 to fluid outlet aperture 48.

As illustrated in FIG. 3, when actuated, piezoelectric device 12 bends within housing 20 to form a gap 60 between seat 42 and metal support structure 16. The formation of gap 60 allows fluid to flow into housing 20 via fluid inlet aperture 40 and into cavity 30. Since now, a fluid communication passageway exists between fluid inlet aperture 40 and cavity 30, fluid can now flow out of housing 20 via fluid outlet aperture 48. Fluid flow through cavity 30 is indicated by arrow 62. In order to terminate the flow of fluid through housing 20, the voltage applied to electrical contacts 52 and 54 which initially caused piezoelectric device 12 to be actuated as illustrated in FIG. 3, may be reversed or allowed to decay such that piezoelectric device 12 returns to its deactuated state, as illustrated in FIG. 2, to thereby close fluid inlet aperture 40.

The amplitude of the applied voltage, applied to spring electrical contacts 52 and 54 determines the amount of deflection of piezoelectric device 12 and, therefore, the distance of gap 60 between seat 42 and metal support structure 16. It therefore can be seen that the size of gap 60 determines the amount or rate of fluid flow within housing 20 of piezoelectric valve operator 10. Since piezoelectric device 12 can be positively and accurately controlled by the voltage supply, the flow of fluid through housing 20 can be accurately maintained and quickly started and stopped to provide a positive switching valve action.

It therefore can be seen that the present piezoelectric valve operator is simple in construction and operation to improve reliability and minimize manufacturing costs. The present piezoelectric valve operator is lightweight and has no moving components other than the piezoelectric device itself for the control of fluid flow. The present piezoelectric valve operator further is operable to control the rate of fluid flow.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A piezoelectric fluid control valve comprising:
a split housing surrounding a generally planar cavity, the housing being separated into first and second members along a plane parallel to the plane of the cavity in which the first member contains fluid inlet and outlet apertures and the second member contains first and second flexible electric contact elements connected to opposite terminals of a voltage source;
a deformable conductive plate element captured at its perimeter between the members of the split housing, oriented parallel to the plane of the cavity and contained therewithin; and
a piezoelectric element bonded to the side of the plate element opposite the fluid apertures in a position proximate to the center of the plate element such that the piezoelectric element is supported by the plate element without contacting the housing at its perimeter,
wherein the first flexible electric contact element presses against the piezoelectric element and the second flexible electric contact element presses against the deformable conductive plate such that the plate is caused upon actuation of the piezoelectric element by the voltage source to travel between a first position in which the plate occludes the passage of fluid between at least one of the fluid apertures and the cavity and a second position in which the plate is deformed away from the at least one aperture, allowing fluid flow through the cavity between the inlet and outlet apertures.

2. The valve of claim 1 wherein said voltage source includes:
means for varying said voltage for controlling the rate of flow through said cavity.

3. The valve of claim 1 wherein the deformable plate comprises a metal plate which is flat in its undeformed first position.

4. The valve of claim 1 wherein the fluid inlet aperture is located in a raised, centrally located projection of the first housing member which extends into the cavity such that the aperture contacts and is occluded by the central area of the plate element in its first position.

* * * * *